United States Patent [19]

Rudd et al.

[11] 4,170,260

[45] Oct. 9, 1979

[54] EXHAUST PIPE COOLING CLAMP FOR MOTORCYCLES

[75] Inventors: Thomas H. Rudd, Wayzata; James M. Preisler, Bloomington, both of Minn.

[73] Assignee: Drag Specialties, Inc., Minneapolis, Minn.

[21] Appl. No.: 828,836

[22] Filed: Aug. 29, 1977

[51] Int. Cl.² .............. F28F 9/06; F16L 19/04; F16L 23/00
[52] U.S. Cl. .................... 165/51; 285/337; 285/411; 285/413; 60/321; 123/41.69
[58] Field of Search ............ 165/51; 285/337, 411, 285/413; 60/321, 313; 180/33 A, 33 C, 64 A; 123/41.69

[56] References Cited

U.S. PATENT DOCUMENTS

| 630,641 | 8/1899 | Albree | 285/337 |
|---|---|---|---|
| 961,987 | 6/1910 | Rust | 285/413 |
| 2,009,744 | 7/1935 | Pfefferle | 285/337 |
| 2,026,848 | 1/1936 | Ruber | 60/321 |
| 2,894,504 | 5/1961 | Boughton | 285/413 |
| 3,453,824 | 7/1969 | Biesecker | 60/313 |
| 3,515,416 | 6/1970 | Pickert | 285/413 |
| 3,600,012 | 8/1971 | Stafford | 285/413 |
| 3,895,833 | 7/1975 | Thiessen | 285/413 |
| 4,023,836 | 5/1977 | Applehans | 285/413 |

*Primary Examiner*—William L. Freeh
*Attorney, Agent, or Firm*—Williamson, Bains, Moore & Hansen

[57] ABSTRACT

A finned cooling clamp for dissipating heat from motorcycle exhaust pipes is comprised of two arcuate collar segments which can be removably interlocked together around an exhaust pipe. The collar segments are interlocked together at their opposite ends by mating locking elements. Locking heads on one end of the collar segments are apertured to receive a fastener utilized for attaching the cooling clamp to a cylinder head of a motorcycle. The interlocked clamp segments form a continuous, annular clamp conforming to the shape of a mounting flange affixed to a motorcycle exhaust pipe. The mounting flange is also apertured, and the fastener extends through it as well as through the clamp collar segments to attach an exhaust pipe to a motorcycle cylinder head.

15 Claims, 7 Drawing Figures

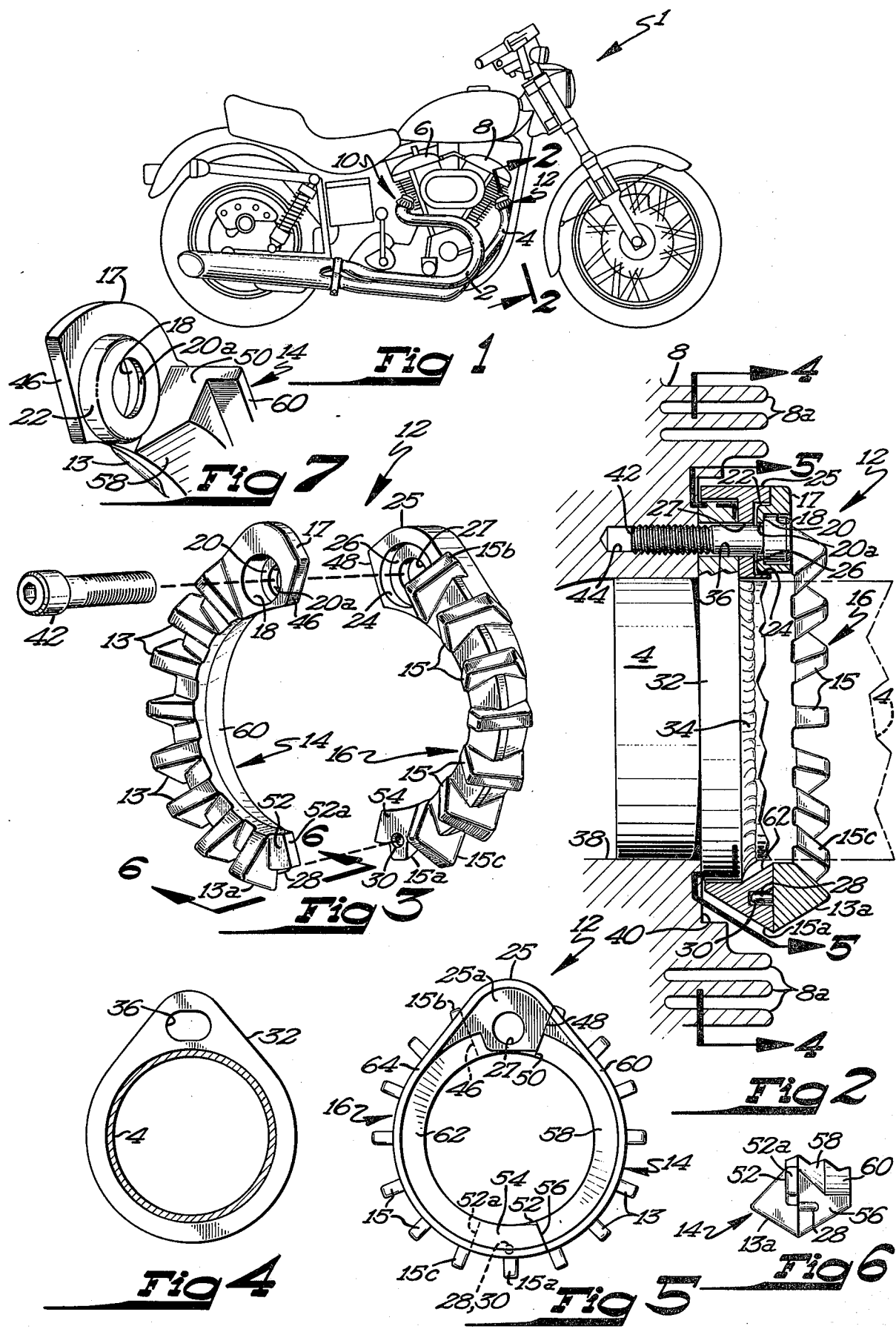

EXHAUST PIPE COOLING CLAMP FOR MOTORCYCLES

BACKGROUND OF THE INVENTION

Exhaust pipes on motorcycles become very hot during motorcycle operation. This not only poses a hazard to motorcycle operators, but also undesirably discolors chrome-plated exhaust pipes. Up to the present time there has been no cooling device which can be attached to motorcycle exhaust pipes without removing the entire exhaust system. It is with these problems in mind that the two piece cooling clamp of this invention has been developed.

BRIEF SUMMARY OF THE INVENTION

The exhaust pipe cooling clamp of this invention is particularly characterized by its two piece construction and interlocking mounting arrangement which permits it to be quickly and easily installed around motorcycle exhaust pipes in secure, heat dissipating relation therewith without removing the exhaust pipe assembly.

These basic objectives are realized by utilizing a pair of arcuate collar segments which can be removably interlocked together at their opposite ends to define a continuous, annular clamp of arcuate shape. The inside opening of the interlocked collar segments is sized to fit snuggly around an exhaust pipe of predetermined diameter.

The cooling clamp collar segments are advantageously interlocked together at one end by mating, overlapping locking heads having aligned apertures therethrough. A mounting flanged affixed around a motorcycle exhaust pipe is also apertured, and the collar segments are contoured to conform to the peripheral shape of the flange. With the collar segments interlocked around an exhaust pipe and their locking head apertures aligned with the flange aperture, a fastener is secured through the collar segments and the flange into a motorcycle cylinder head. This mounting arrangement permits the same fastener to mount an exhaust pipe on a cylinder head and also secure the separable collar segments together around the exhaust pipe against the mounting flange.

The opposite ends of the collar segments preferably terminate in flat, circumferentially extending end portions which overlap in face-to-face, abutting relation to form an attractive, continuous annular clamp when the clamp segments are interlocked together. These opposite end portions of the clamp segments are separably interlocked against displacement by a pin projecting from one collar end portion into an aligned aperture in the other.

Desired heat dissipation is achieved by making the collar segments from heat conductive metal and forming a plurality of circumferentially spaced cooling fins thereon.

These and other objects of this invention will become readily apparent as the following description is read in conjunction with the accompanying drawings wherein like reference numerals have been utilized to designate like elements throughout the several views.

BRIEF DESCRIPTION OF THE DRAWINGS

FIG. 1 is a side elevation view of a motorcycle having the cooling clamp of this invention mounted on its exhaust pipes;

FIG. 2 is a vertical section view taken along lines 2—2 of FIG. 1 and showing the cooling clamp mounted on a motorcycle exhaust pipe;

FIG. 3 is an exploded, perspective view of the two-piece cooling clamp mounted at the location shown in FIG. 1;

FIG. 4 is a vertical section view of the exhaust pipe and mounting flange taken along lines 4—4 of FIG. 2;

FIG. 5 is a vertical section view of the cooling clamp assembly taken along lines 5—5 of FIG. 2;

FIG. 6 is an end view of one of the cooling clamp collar segments taken along lines 6—6 of FIG. 3; and FIG. 7 is a fragmentary perspective view of one of the cooling clamp collar segments.

DESCRIPTION OF THE PREFERRED EMBODIMENT

Referring now to the drawings, I have shown in FIG. 1 a motorcycle generally indicated by reference numeral 1 and having a pair of exhaust pipes 2 and 4. These exhaust pipes extend from two cylinder heads 6 and 8 in a conventional manner. Two cooling clamps 10 and 12 constructed and assembled as disclosed in detail herein are mounted on each of the exhaust pipes 2 and 4 adjacent cylinder heads 6 and 8.

Cooling clamps 10 and 12 are identical, clamp 12 being shown in detail in FIGS. 2-7. As shown most clearly in FIG. 3, each of the cooling clamps is comprised of a pair of interlocking collar segments 14, 16 of generally semicircular configuration. Collar segments 14 and 16 are made from heat conductive metal, and preferably are die cast aluminum components. A plurality of heat dissipating, cooling fins 13 and 15 are integrally formed on each of the die cast collar segments 14 and 16, these fins extending generally radially and being circumferentially spaced around the arcuate collar segments.

As may be best understood by reference to FIGS. 2, 3 and 7, collar segment 14 has a locking head 17 formed on one end thereof. This locking head is apertured at 18 to receive a threaded fastener as hereinafter set forth. At the base of aperture 18 is a fastener seat 20 having an inner hole 20a extending therethrough for insertion of a fastener. A protruding, circular boss 22 projects generally normal to the plane of the collar segments 14 and 16 from the inside face of locking head 17. A mating, circular recess 24 is formed in opposed locking head 25 of collar segment 16 and serves as a female locking member within which male boss 22 is received when the two clamp segments 14 and 16 are interlocked together around an exhaust pipe. When the two clamp segments are assembled as hereinafter explained, boss 22 abuts against flat seat 26 at the base of circular recess 24. Hole 27 extends through seat 26 in locking head 25 to receive a threaded fastener, this hole being aligned with apertures 18 and 20a in locking head 17 when the two clamp segments are assembled together.

At their opposite ends, collar segments 14 and 16 are adapted to be locked together against displacement in radial and circumferential directions by a pin and aperture 28, 30. As is shown most clearly in FIGS. 2, 3 and 6, pin 28 projects laterally from one end of collar segment 14 in a direction generally normal to the plane of collar segment 14. Pin 28 is formed on flat, circumferentially extending end portion 52 of collar segment 14, and aperture 30 is formed within opposed, flat end portion 54 of collar segment 15 at a location where it will be aligned with pin 28 when the two collar segments are positioned for assembly around exhaust pipe 4.

As a mounting means for exhaust pipes 2, 4 as well as for cooling clamps 10, 12, a flange ring 32 is affixed around the external periphery of exhaust pipes 2 and 4 in contact therewith. Flange ring 32 is preferably welded to the exhaust pipes, weld bead 34 being shown in FIG. 2. As appears most clearly in FIGS. 2 and 4, a through hole 36 extends through one end of flange ring 32 for insertion of a fastener 42. Exhaust pipes 2 and 4 are normally installed within exhaust ports formed in cylinder heads 6 and 8, exhaust pipe 4 being shown in FIG. 2 seated within exhaust port 38 of head 8. The exhaust pipe is inserted within exhaust port 38 so that flange 32 abuts against milled face 40 machined on head 8 around exhaust port 38. Exhaust pipes 2 and 4 are held in place by insertion of a threaded fastener such as cap screw 32 through flange hole 36 into a tapped hole 44 in the cylinder heads, as is illustrated in FIG. 2 with respect to head 8.

As an original factory installation, or as a field assembly on motorcycles, cooling clamps 10 and 12 are installed by mounting the separate collar segments 14 and 16 around exhaust pipe 4 in the manner shown in FIGS. 2 and 5. Collar segments 14 and 16 are oriented so that their locking heads 17 and 25 overlap with boss 22 seated within circular recess 24 and abutting against seat 26. End portions 52 and 54 of the collar segments are also disposed in overlapping relationship and pin 28 is inserted within aligned aperture 30. In this manner collar segments 14 and 16 are interlocked together at their opposite ends with pin 28 extending generally longitudinally of exhaust pipe 4. The interlocked clamping segments 14 and 16 are rotatably adjusted to bring their aligned apertures 18, 20a and 27 into alignment with aperture 36 in flange ring 32. Cap screw 42 is then inserted through the aforesaid collar segment apertures and flange hole 36 and threaded into tapped hole 34 in cylinder head 8. Thus, fastener 42 holds exhaust pipe 4 on cylinder head 8 and also secures removable collar segments 14, 16 together around the exhaust pipe against flange 32. When interlocked together and secured in place around exhaust pipe 4 in the aforesaid manner, collar segments 14 and 16 define together a continuous, annular clamp of arcuate configuration extending generally perpendicular to the longitudinal axis of exhaust pipe 4. As may be noted with reference to FIGS. 4 and 5, mounting flange 32 conforms substantially to the shape of the annular clamp assembly 12 with the clamp abutting against the outer face of flange ring 32 remote from the motorcycle cylinder head 8.

The positions which collar segments 14 and 16 will assume with respect to each other when interlocked around an exhaust pipe are shown in FIGS. 2, 3 and 5. Locking head 17 on collar segment 14 terminates in an inclined, free end 46 which conforms to the inclination of, and abuts against, an adjacent end fin 15b adjacent locking head 25 of collar segment 16. Locking heads 17 and 25 further abut together along the contacting joint between free end surface 48 of locking head 25 and end face 50 of collar segment 14. End face 50 is clearly shown in FIG. 7.

With collar segments 14 and 16 interlocked together at their opposite ends with pin 28 seated in mating recess 30, flat, circumferentially extending end portions 52 and 54 overlap in face to face, abutting relationship. Flat end portions 52 and 54 extend in planes co-planar with the planes of collar segments 14 and 16. With the collar segments so interlocked together, inclined, free end 52a of end portion 52 on collar segment 14 abuts against the adjacent face of end fin 15c of collar segment 16. As is indicated in FIG. 5, outer end 52a of collar segment 14 is inclined to conform to the inclination of fin 15c and lies flush thereagainst. The end face of free end portion 54 of collar segment 16 has the same shape as that of fin 15a shown in FIG. 2 and abuts against adjoining end face 56 of collar segment 14 having an identical contour as shown in FIG. 6. End fins 13a and 15a abut in alignment with each other when pin 28 is seated in aperture 30 to define a total, continuous fin assembly of identical configuration to those shown at 13 and 15 on collar segments 14 and 16. The aforesaid abutting engagement of identically contoured end components of the collar segments at their opposite ends ensures even symmetry of the assembled collars 10 and 12 and further restrains the two collar segments 14 and 16 against displacement with respect to each other.

It is to be noted that collar segment 14 has a beveled inner peripheral surface 58 which terminates in an annular rib projecting longitudinally of exhaust pipe 4. Similarly, collar segment 16 has a beveled inner peripheral surface 62 shown in FIG. 5 which terminates at a laterally projecting annular rib 64. When the collar segments are interlocked together, annular ribs 60 and 64 form together a continuous annular rim around the periphery of the cooling clamps 10 and 12 conforming to the peripheral shape of flange ring 32. This annular rim defines with the adjoining annular bodies of collar segments 14 and 16 a recess within which flange ring 32 is seated against the collar segments with the apertured end thereof lying flush against vertical face 25a of locking head 25. With flange ring 32 and collar segments 14, 16 so mounted with respect to each other, beveled faces 58, 62 fit snugly over weld bead joint 34 between the flange and exhaust pipe 4. In the interlocked, assembled position of collar segments 14 and 16, the inner arcuate edges of beveled surfaces 58 and 62 define a circular opening having a predetermined diameter sized to fit snugly over the outside of the motorcycle exhaust pipes.

It will be appreciated that the two piece cooling clamp structure comprised of separable, interlocking segments 14 and 16 as described above provide the very simple and quick way of mounting a cooling clamp on motorcycle exhaust pipes without removing the exhaust pipes from the cylinder heads. The snug contact of the cooling clamp assemblies with the peripheral surface of the exhaust pipes ensures effective heat dissipation through integral cooling fins 13 and 15. It is contemplated that various changes may be made in the size, shape and construction of the cooling clamp structure disclosed herein without departing from the spirit and scope of the invention as defined in the following claims:

What is claimed is:

1. A cooling clamp for motorcycle exhaust pipes comprising:

a pair of arcuate collar segments removably interlocked together at their opposite ends and defining together a continuous, annular clamp of arcuate configuration having an inside opening sized to fit snugly around an exhaust pipe of predetermined diameter;

said collar segments being interlocked together at one end by mating locking heads thereon, one of said locking heads on one collar segment having a circular, male member projecting therefrom generally normal to the plane of said collar segments, and the other one of said locking heads having a female recess thereon in which said male member is removably seated in interlocking engagement therewith; and aligned apertures extending through said male member and the female recess in said locking heads for the insertion of a fastener therethrough.

2. A cooling clamp as defined in claim 1 wherein:

said collar segments are made from heat conductive metal and have a plurality of heat dissipating fins integrally formed at circumferentially spaced locations thereon.

3. A cooling clamp as defined in claim 1 wherein:

said pin and said aligned aperture are formed on flat, circumferentially extending end portions of said opposite ends of said collar segments, said flat end portions being coplanar with the planes of said collar segments, integral therewith, and overlapping in face-to-face, abutting relationship when said collar segments are interlocked together.

4. A cooling clamp as defined in claim 3 wherein:

a plurality of generally radially extending, heat dissipating fins are integrally formed on said collar segments at circumferentially spaced locations thereon and project in planes generally normal to the plane of said collar segments; and the free end extremity of the said end portion on one of said collar segments abuts against an adjacent end fin on said opposite end of the other collar segment when said collar segments are interlocked together at their opposite ends.

5. A cooling clamp as defined in claim 4 wherein:

the free end extremity on the locking head of said one collar segment abuts against an adjacent end fin adjacent the locking head on said other collar segment when said collar segments are interlocked together.

6. An exhaust pipe cooling clamp removably mounted on a motorcycle exhaust pipe comprising:

a pair of separable, arcuate collar segments removably interlocked together at their opposite ends around a motorcycle exhaust pipe and defining together a continuous, annular clamp of arcuate configuration extending generally perpendicular to the longitudinal axis of said exhaust pipe, said collar segments being made from heat conductive material;

a mounting flange rigidly and permanently affixed around the external periphery of said exhaust pipe in contact therewith, said flange conforming substantially to the shape of said annular clamp with said clamp abutting against the outer face of said flange remote from the motorcycle engine;

each of said collar segments having an annular rib on the outer periphery thereof projecting longitudinally of said exhaust pipe, said ribs forming together a continuous annular rim around the periphery of said cooling clamp conforming to the peripheral shape of said mounting flange, and said annular rim defining with the adjoining annular bodies of said collar segments a recess within which said flange is seated against said collar segments;

aligned apertures through said collar segments at one end thereof positioned in alignment with a through hole in one end of said flange; and a fastener extending through said collar segment apertures and said flange hole and secured within a cylinder head of a motorcycle adjacent an exhaust port communicating with said exhaust pipe, whereby said fastener holds said exhaust pipe on said cylinder head and secures said removable collar segments together around said exhaust pipe against said flange.

7. Apparatus as defined in claim 6 wherein:

said mounting flange is welded onto the peripheral surface of said exhaust pipe; and each of said collar segments has a beveled, inner peripheral face thereon which fits over the weld bead joint between said flange and said exhaust pipe.

8. Apparatus as defined in claim 6 wherein:

each of said collar segments has a plurality of heat dissipating fins integrally formed at circumferentially spaced locations thereon.

9. Apparatus as defined in claim 6 wherein:

mating locking heads are formed on said collar segments at said one end thereof, said locking heads overlapping in interlocking relation and having said aligned apertures extending therethrough.

10. Apparatus as defined in claim 9 wherein:

one of said locking heads on one collar segment has a male member projecting therefrom generally normal to the plane of said collar segments, and the other one of said locking heads has a female recess therein in which said male member is removably seated in interlocking engagement therewith.

11. Apparatus as defined in claim 6 and further including:

means releasably interlocking the opposite ends of said collar segments together.

12. Apparatus as defined in claim 11 wherein:

said means interlocking said opposite ends of said collar segments together comprises a locking pin projecting longitudinally of said exhaust pipe from one of said collar segments and an aligned opening in the other collar segment within which said pin is received when said collar segments are interlocked together.

13. Apparatus as defined in claim 11 wherein:

mating locking heads are formed on said collar segments at said one end thereof, said locking heads overlapping in interlocking relation; and said opposite ends of said collar segments terminate in flat, circumferentially extending end portions extending in planes co-planar with the planes of said collar segments and overlapping in face-to-face, abutting relationship.

14. Apparatus as defined in claim 13 wherein:

a plurality of generally radially extending, heat dissipating fins are integrally formed on said collar segments at circumferentially spaced locations thereon and project in planes generally normal to the plane of said collar segments; and the free end extremity of the said end portion on one of said collar segments abuts against an adjacent end fin on said opposite end of the other collar segment when said collar segments are interlocked together at their opposite ends.

15. Apparatus as defined in claim 14 wherein:

the free end extremity on the locking head of said one collar segment abuts against an adjacent end fin adjacent the locking head on said other collar segment when said collar segments are interlocked together.

* * * * *